(12) United States Patent
Zabarski et al.

(10) Patent No.: US 7,725,513 B2
(45) Date of Patent: May 25, 2010

(54) MINIMUM PROCESSOR INSTRUCTION FOR IMPLEMENTING WEIGHTED FAIR QUEUING AND OTHER PRIORITY QUEUING

(75) Inventors: Boris Zabarski, Tel Aviv (IL); David Sitbon, Ranana (IL); Oded Norman, Pardesia (IL)

(73) Assignee: Ikanos Communications, Inc., Fremont, CA (US)

( * ) Notice: Subject to any disclaimer, the term of this patent is extended or adjusted under 35 U.S.C. 154(b) by 1059 days.

(21) Appl. No.: 10/757,587

(22) Filed: Jan. 15, 2004

(65) Prior Publication Data

US 2004/0148320 A1      Jul. 29, 2004

Related U.S. Application Data

(60) Provisional application No. 60/440,026, filed on Jan. 15, 2003.

(51) Int. Cl.
    *G06F 15/00*    (2006.01)
(52) U.S. Cl. ...................................................... 708/207
(58) Field of Classification Search .......... 708/200–209
    See application file for complete search history.

(56) References Cited

U.S. PATENT DOCUMENTS

| | | | |
|---|---|---|---|
| 4,597,053 A | | 6/1986 | Chamberlin et al. |
| 5,051,939 A | * | 9/1991 | Nakamura .................. 708/207 |
| 5,726,923 A | | 3/1998 | Okumura et al. |
| 5,787,407 A | * | 7/1998 | Viot .............................. 706/8 |
| 5,822,557 A | | 10/1998 | Suetake et al. |
| 5,894,426 A | * | 4/1999 | Ju .............................. 708/207 |
| 5,907,842 A | | 5/1999 | Mennemeier et al. |
| 5,991,785 A | * | 11/1999 | Alidina et al. .............. 708/207 |
| 6,397,240 B1 | * | 5/2002 | Fernando et al. ............ 708/603 |
| 6,411,975 B1 | | 6/2002 | Wong |
| 6,724,721 B1 | * | 4/2004 | Cheriton ..................... 370/229 |
| 6,829,217 B1 | * | 12/2004 | Bechtolsheim et al. ...... 370/229 |
| 2003/0185305 A1 | * | 10/2003 | MacInnis et al. ....... 375/240.25 |

FOREIGN PATENT DOCUMENTS

WO          WO 02/27475 A      4/2002

OTHER PUBLICATIONS

International Search Report mailed May 24, 2005 (European Search Authority).
Cobb, J. A. et al., "Time-shift scheduling: fair scheduling of flows in high speed networks" Proceedings 1996 International Conference on Network Protocols, Columbus, OH, USA Oct. 29-Nov. 1, 1996, Los Alamitos, CA, USA, IEEE Computer Soc., US Oct. 29, 1996, pp. 6-13, XP010204413.

* cited by examiner

*Primary Examiner*—Chat C Do
(74) *Attorney, Agent, or Firm*—Thomas, Kayden, Horstemeyer & Risley, LLP

(57) ABSTRACT

The present invention provides techniques for efficiently determining a minimum or maximum of a plurality of values and the index of the minimum using registers of a processor. The present invention also provides for various processor instructions for determining the minimum/maximum and index of two or more values. The present invention finds particular benefit in implementing heaps and in systems utilizing Weighted Fair Queuing (WFQ).

21 Claims, 9 Drawing Sheets

Processor Instruction: Min rD, rA, rB, index

MINIMUM PROCESSOR INSTRUCTION FOR IMPLEMENTING WEIGHTED FAIR QUEUING AND OTHER PRIORITY QUEUING

CROSS-REFERENCE TO RELATED APPLICATIONS

The present application claims priority to U.S. Provisional No. 60/440,026, filed Jan. 15, 2003, and entitled "Minimum Processor Instruction for Implementing Weighted Fair Queuing and Other Priority Queuing," the entirety of which is incorporated by reference herein.

FIELD OF THE INVENTION

The present invention relates generally to determining a minimum and/or maximum of a multiplicity of values and more particularly to using efficient processor instructions to determine a minimum and/or maximum of the values stored in a plurality of registers of a processor.

BACKGROUND OF THE INVENTION

Various processes have been developed to determine the extreme value(s) (i.e., a minimum or maximum) of a plurality of values. One such method includes a sequential comparison, whereby the values are arranged in a list and each value in the list is compared to the minimum of the previous values of the list. The number of steps needed to perform a sequential comparison of n values is on the order of O(n) steps. Another known sorting process includes maintaining a sorted queue, whereby each of the plurality of values is less than or equal to one of its neighboring values and greater than or equal to its other neighboring value. Accordingly, the extraction of either the minimum or maximum value of the sorted queue is on the order of O(1) steps, while inserting a value into the sorted queue is on the order of O(n) steps.

Another sorting method combining the benefits of both the unsorted and sorted queues includes generating and maintaining a heap data structure. In a minimum heap data structure, each parent node of the heap is either less than or equal to its child nodes. This results in the minimum value of the heap being at the root node of the heap. Therefore, the identification of the minimum value in a proper heap is on the order of O(1). However, the extraction or modification of the minimum value from a heap of n values is on the order of O(log n) steps, as is the insertion of a new value into the heap data structure.

Heap data structures and/or other sorting processes often are used in network processors to implement various scheduling processes, such as Weighted Fair Queuing (WFQ) or Generalized Processor Scheduling (GPS), to ensure that each incoming data stream receives a certain portion of the outgoing data stream bandwidth and/or to provide a latency bound for each incoming data stream. For example, a common method to implement WFQ scheduling is to associate a "due timestamp" value with each of the input queues used to buffer the incoming data streams. For each output cycle, a WFQ scheduler selects the input queue with the minimum "due timestamp" to provide a protocol data unit (PDU) for output. During or after the transmission of the PDU (e.g., a data packet) from the selected queue, the scheduler updates the "due timestamp" of the selected queue based at least in part on the assigned bandwidth and the size of the current PDU in the selected queue. Accordingly, a minimum heap data structure or a sorted queue often is used to determine the minimum "due timestamp" of the plurality of input queues as well as the index associated with the queue.

While priority queues, such as sorted queues or heap data structures, often are useful in scheduling processes, the insertion, removal, and/or maintenance of such priority queues often consumes a considerable portion of the processing cycles of a processor implementing the scheduling process. For example, to determine the minimum value in an unsorted queue, at least one compare instruction and one jump instruction typically are performed for each comparison of a value in the queue to the minimum of the previous values. As such, at least 2n instructions are performed to identify the minimum value and/or its index in the queue. Similarly, for heap data structures, the insertion of a new value (such as when the "due timestamp" for an input queue is modified) into the heap data structure or a removal of a value often necessitates a branch instruction and a jump instruction for each comparison of a parent node to a child node. Since O(log n) comparisons typically are performed when inserting/removing a value into/from a heap data structure of n values, the typical insertion/removal operation takes at least 2 log n cycles to perform.

Accordingly, an improved processor instruction, method, and/or system for determining an extreme value of a plurality of values in a heap or other priority queue would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

A WFQ protocol data unit (PDU) system typically has several input queues. At each queuing cycle, the scheduling system selects one of the queues for transmission of a packet in the selected queue by providing the packet to an outgoing port or by placing the packet in an output queue. When the queues have bandwidth shares that sum up to one, a WFQ scheduler typically can guarantee that each of the queues receives at least its share of the bandwidth on the outgoing port, where each queue may have a set or dynamic portion of the bandwidth. It also can provide a latency bound for each queue.

A common method for implementing a WFQ PDU scheduling system in a communications processor is by having a "due" timestamp value associated with each of he queues. The scheduler, for each PDU that is transmitted, selects the queue with the minimum "due" timestamp. While transmitting a PDU from the selected queue, the scheduler program updates the "due" timestamp of the selected queue using the queue's share of the bandwidth and the current PDU size.

In order to determine the minimum "due" timestamp and the index of the corresponding queue, the present invention provides for a processor instruction for determining the minimum of at least two values and the index of the minimum. The processor instruction has as inputs a destination register rD, two source registers rA and rB, and an immediate field ("index"). The destination register and a source register may comprise a common or same register.

In one embodiment, the processor instruction is adapted to manipulate the processor to compare (unsigned) the N low-order bits of rA and rB. If the N low-order bits of rA are less than or equal to the N low-order bits of rB, the processor instruction manipulates the processor to copy at least a portion of the contents of register rA to the destination register rD. Otherwise, the immediate field is concatenated with the N low-order bits of rB and the concatenated value is copied to the destination register rD.

In another embodiment, the value stored in rA is compared to the value stored in rB. If the value in rA is less than or equal to the value in rB, the value in rA is copied to the destination register rD and the value of a MINDEX register remains unchanged. Otherwise, the value of rB is copied to rD and the immediate field is copied to the MINDEX register.

In yet another embodiment, the processor instruction is adapted to manipulate a processor to compare, for each of the two source registers, the value of a first portion of the register with the value of a second portion of the register. The minimum value of the first portion and the second portion of each register is copied to the corresponding portion of the destination register. Likewise, the corresponding portion of the MINDEX register is updated to reflect the index of the minimum values of the source registers.

Heaps often are used to implement traffic shapers in networking equipment. The processor instructions described above can be utilized in such an operation to efficiently determine the minimum and its index of the children of a parent node in fewer processor cycles as compared to typical sorting processes using a combination of branch and jump processor instructions. This is especially applicable in when implementing variations of heaps having up to N children (N=8, for example) as opposed to two children as in most standard heaps.

In accordance with one embodiment of the present invention, a processor for determining a minimum value of a plurality of values stored in source registers and determining an index value of a source register having the minimum value is provided. The processor comprises a destination register, a first source register storing a first value, a second source register storing a second value, means for comparing the first value stored in the first source register with the second value stored in the second source register, means for storing the first value in the destination register when the first value is less than or equal to the second value and means for concatenating the index value with the second value into a concatenated value and storing the concatenated value in the destination register when the second value is less than the first value.

In accordance with another embodiment of the present invention, a processor for determining a minimum value of a plurality of values stored in source registers and determining an index value of source register having the minimum value is provided. The processor comprises means for determining a first minimum value of a first value and a second value, means for determining a second minimum value of a third value and a fourth value, means for storing the first minimum value in a first portion of a first destination register and the second minimum value in a second portion of the first destination register, and means for storing a first index value associated with the first minimum value in a first portion of a second destination register and a second index value associated with the second minimum value in a second portion of the second destination register, wherein the means for determining the first minimum value and the means for determining the second minimum value are adapted to execute in parallel.

In accordance with yet another embodiment of the present invention, a method for determining a minimum value and a corresponding index value of a plurality of source registers of a processor is provided. The method comprises the steps of, for each of the plurality of source registers, comparing a value stored in the source register with a value stored in a destination register, concatenating the value stored in the source register with an index value associated with the source register and storing the concatenated value in the destination register when the value stored in the source register is less than the value stored in the destination register, and wherein the destination register initially includes an index value and a value of a first source register of the plurality of source registers.

In accordance with an additional embodiment of the present invention, a customer premise equipment (CPE) is provided. The CPE comprises a network interface operably connected to a first network segment, a network interface operably connected to a second network segment and a processor operably connected to the network interfaces and being adapted to compare a first value stored in a first source register of the processor with a second value stored in a second source register of the processor, store the first value in a first destination register of the processor when the first value is less than or equal to the second value and store the second value in the first destination register of the processor and an index value in a second destination register of the processor when the second value is less than the first value, the index value representing the second source register.

In accordance with one embodiment of the present invention, a processor for determining a maximum value of a plurality of values stored in source registers and determining an index value of a source register having the maximum value is provided. The processor comprises a destination register, a first source register storing a first value, a second source register storing a second value, means for comparing the first value stored in the first source register with the second value stored in the second source register, means for storing the first value in the destination register when the first value is greater than or equal to the second value and means for concatenating the index value with the second value into a concatenated value and storing the concatenated value in the destination register when the second value is greater than the first value.

In accordance with another embodiment of the present invention, a processor for determining a maximum value of a plurality of values stored in source registers and determining an index value of source register having the maximum value is provided. The processor comprises means for determining a first maximum value of a first value and a second value, means for determining a second maximum value of a third value and a fourth value, means for storing the first maximum value in a first portion of a first destination register and the second maximum value in a second portion of the first destination register, and means for storing a first index value associated with the first maximum value in a first portion of a second destination register and a second index value associated with the second maximum value in a second portion of the second destination register, wherein the means for determining the first maximum value and the means for determining the second maximum value are adapted to execute in parallel.

In accordance with yet another embodiment of the present invention, a method for determining a maximum value and a corresponding index value of a plurality of source registers of a processor is provided. The method comprises the steps of, for each of the plurality of source registers, comparing a value stored in the source register with a value stored in a destination register, concatenating the value stored in the source register with an index value associated with the source register and storing the concatenated value in the destination register when the value stored in the source register is greater than the value stored in the destination register, and wherein the destination register initially includes an index value and a value of a first source register of the plurality of source registers.

In accordance with an additional embodiment of the present invention, a customer premise equipment (CPE) is provided. The CPE comprises a network interface operably connected to a first network segment, a network interface operably connected to a second network segment and a processor operably connected to the network interfaces and being adapted to compare a first value stored in a first source register of the processor with a second value stored in a second source register of the processor, store the first value in a first destination register of the processor when the first value is greater than or equal to the second value and store the second value in the first destination register of the processor and an index value in a second destination register of the processor when the second value is greater than the first value, the index value representing the second source register.

One advantage of the present invention is a reduced processing effort for determining a minimum of a plurality of values. Another advantage of the present invention is the simultaneous determination of both a minimum value and the index of the minimum. Still further features and advantages of the present invention are identified in the ensuing description, with reference to the drawings identified below.

Although described herein with respect to determining minimum values, at least one embodiment of the present invention may be implemented to determine any extreme value or other distinguishable characteristic.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the present invention by providing a number of specific embodiments and details involving processor instructions for determining minimum values, maximum values and/or other distinguishable characteristics of a plurality of values as well as the index associated with the minimum/maximum. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

FIGS. 1-8 illustrate exemplary methods for determining the minimum of a plurality of values stored in registers and/or memory and an index associated with the minimum, as well as exemplary processor instructions for manipulating a processor to determining the minimum and index. However, those skilled in the art can implement the present invention to determine the maximum of the plurality of values and the index of the maximum using the guidelines provided herein. Those skilled in the art also may implement the present invention to determine other distinguishable characteristics of one or more data values, using the guidelines provided herein.

Figure 1:
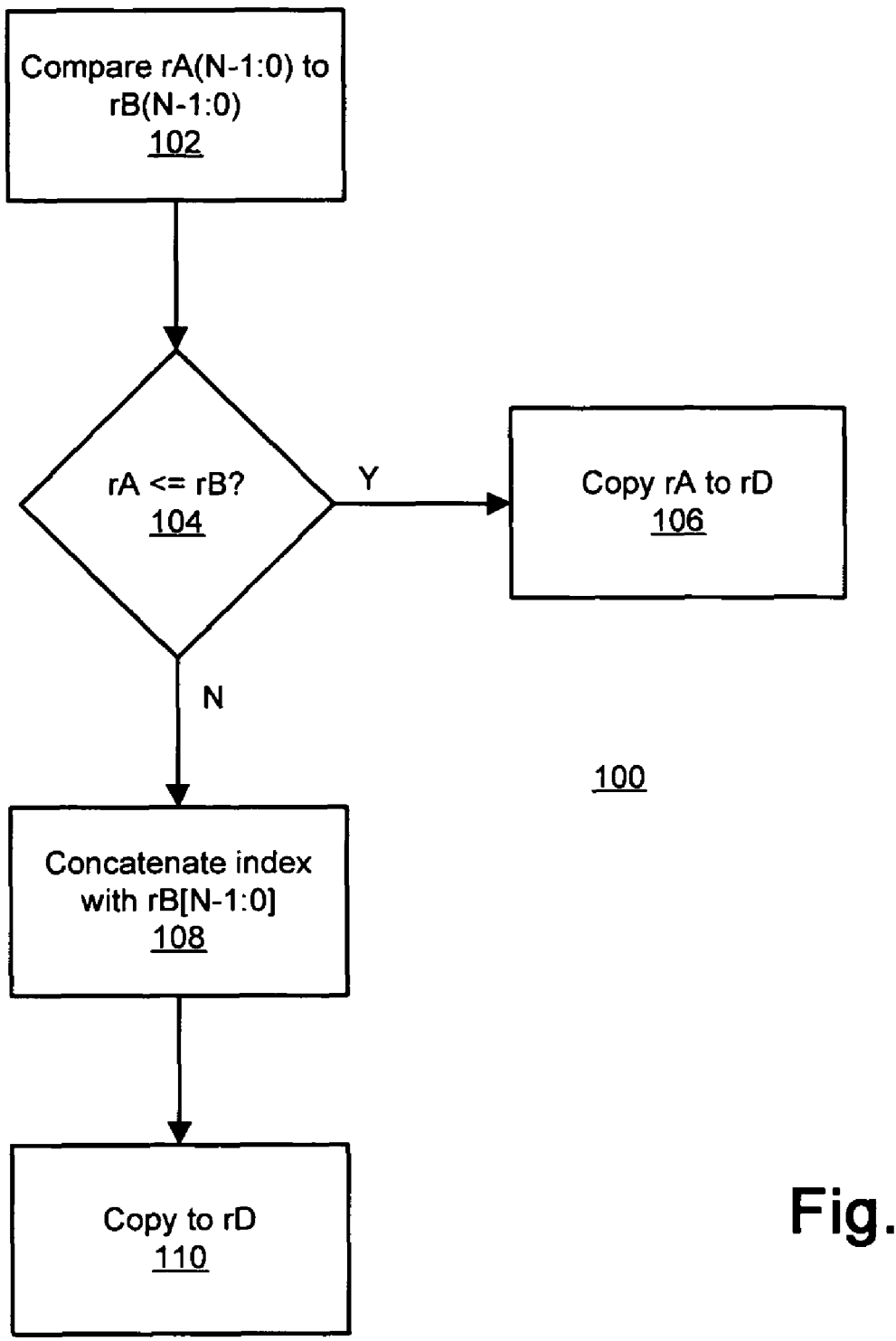
FIG. 1 is a flow diagram illustrating an exemplary "min" processor instruction for determining a minimum of two values and an index associated with the minimum in accordance with at least one embodiment of the present invention.

Referring now to FIG. 1, an exemplary implementation of a processor instruction for determining a minimum of two values and the index of the minimum is illustrated in accordance with at least one embodiment of the present invention. In one embodiment, the processor instruction, herein referred to as the "min" instruction, includes four input fields: a field referencing a destination register of a processor; a field referencing a first source register; a field referencing a second source register; and an immediate field for providing the constant value "index". To illustrate, the Assembly language form of the "min" instruction could be represented as "min rD, rA, rB, index", where rD is the destination register, rA is the first source register, rB is the second source register, and index is the supplied index value. As used herein, a "source" register includes a register having one or more values to be compared, whereas a "destination" register includes a register for storing values, such as the minimum value of two values resulting from a comparison. A register can be both a source register and a destination register for the same "min" processor instruction.

The flow diagram 100 illustrates an exemplary process performed by a processor executing the "min" instruction. In at least one embodiment, the "min" processor instruction illustrated in FIG. 1 is implemented such that it is executed by a processor in one processor cycle.

In at least one embodiment, the N low-order bits of registers rA and rB (each having a total of S bits) represent values to be compared whereas the remaining high-order bits (i.e., S-1 to N) are irrelevant for comparison purposes. Accordingly, at step 102 the processor performs an unsigned comparison using, for example, a comparator on the N low-order bits of rA and rB (designated as rA[N−1:0] and rB[N−1:0], respectively). If the unsigned value stored in rA[N−1:0] is determined to be less than or equal to the unsigned value stored in rB[N−1:0] (step 104), then the processor is manipulated to store the entire value (i.e., rA[S=1:0]) to the destination register rD at step 106, thereby setting the value stored in rD equal to the value stored in rA.

If rB is determined to be less than rA at step 104, then the supplied index value is concatenated with the N lower order bits of rB at step 108. To illustrate, if the "min" instruction processed is "min rD, rA, rB, 3" and rB had a value "0000 1010" (N=6), the index value of 3 ("0011" in binary) would be concatenated with the four low-order bits of rB ("1010" in binary) resulting in a concatenated binary value of "0011 1010". The concatenated value is then stored in the destination register rD at step 110.

Figure 2:
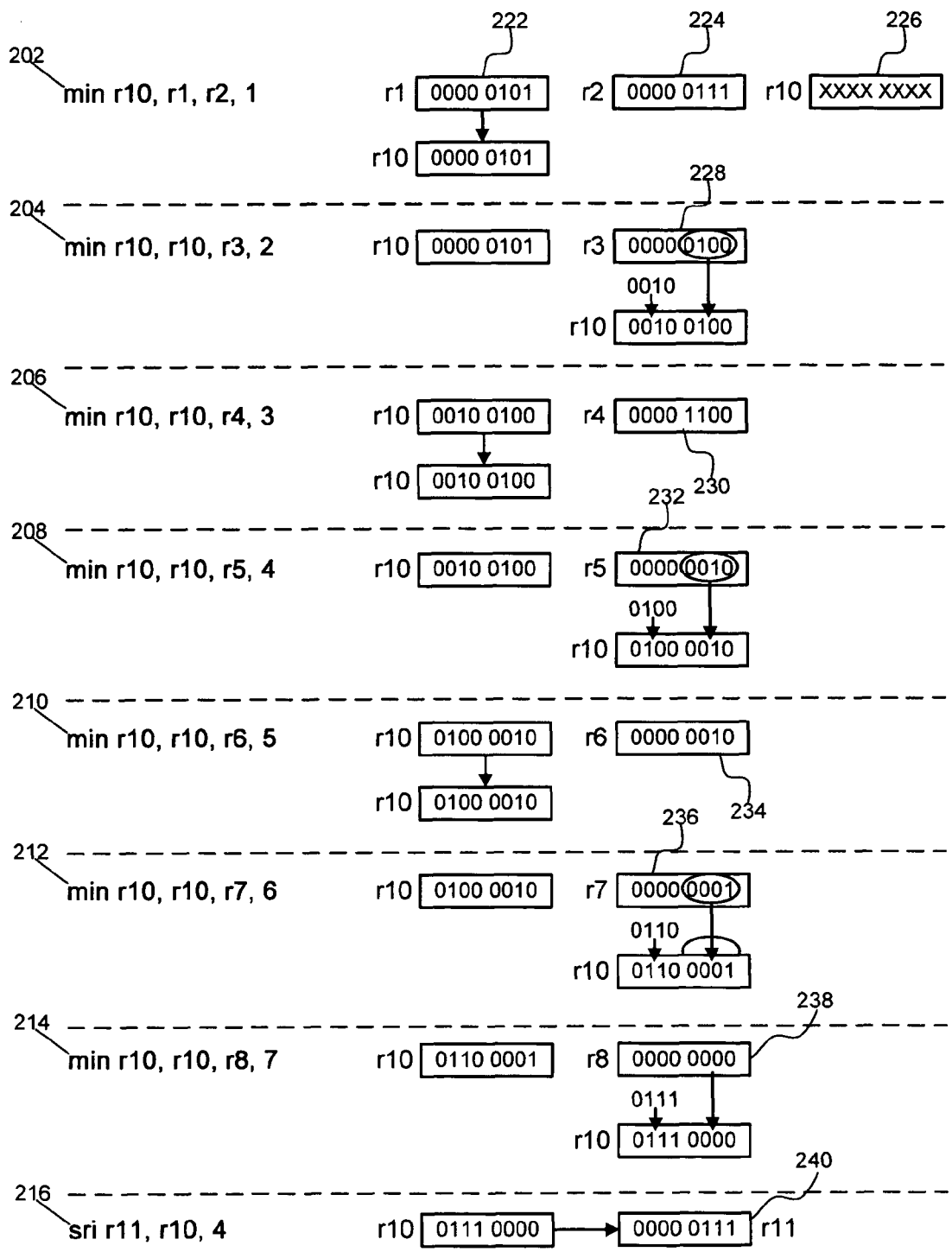
FIG. 2 is a flow diagram illustrating an exemplary sequence of processor instructions of FIG. 1 for determining a minimum of eight values and an index associated with the minimum in accordance with at least one embodiment of the present invention.

Referring now to FIG. 2, an exemplary implementation of a sequence of "min" instructions to determine a minimum value of a plurality of registers is illustrated. A sequence of "min" instructions as described in FIG. 1 can be implemented to determine both the minimum value of a plurality of registers and the index of the register having the minimum value. To illustrate, the following sequence of "min" instructions can be executed to find the minimum value of eight 8-bit source registers (r1-r8) indexed 0-7 respectively. Each source register contains a value represented by the four low-order bits (i.e., rX[3:0]) The resulting minimum and index are stored in an 8-bit destination register r10.

min r10, r1, r2, 1
min r10, r10, r3, 2
min r10, r10, r4, 3
min r10, r10, r5, 4
min r10, r10, r6, 5
min r10, r10, r7, 6
min r10, r10, r8, 7
sri r11, r10, 4

As illustrated in FIG. 2, during the execution of the first "min" instruction "min r10, r1, r2, 1" (instruction 202), the value stored in the four low-order bits of register r1 (register 222) is compared (step 102, FIG. 1) to the four low-order bits of register r2 (register 224). Since the binary value "0101" of register r1 is less than the binary value "0111" of register r2, in one embodiment, the entire contents (i.e., "0000 0101") of register r1 are stored in register r10 (register 226) at step 106 (FIG. 1). Accordingly, the register r10 includes the minimum value of the registers r1 and r2 ("0101") as well as the index of the register having the minimum value, r1 ("0000" or 0).

During the execution of the next "min" instruction "min r10, r10, r3, 2" (instruction 204), the value stored in the four low-order bits of register r3 (register 228) is compared with the minimum value stored in the four low-order bits of register r10 at step 102. In this example, however, the value stored in register r3 is less than the value stored in register r10. Accordingly, the value of the four low-order bits of the register r3 ("0100" in binary) is stored in the four low-order bits of the register r10 and the index (2 or "0010" in binary) is stored in the four high-order bits of register r10 (steps 108 and 110, FIG. 1). Accordingly, the register r10 at this point includes the minimum value ("0100") of the registers r1-r3 as well as the index ("0010" or 2) associated with the register r3 having the minimum value.

For the next "min" instruction "min r10, r10, r4, 3" (instruction 206), the value stored in the four low-order bits of register r4 (register 230) is compared to the value stored in four low-order bits of the register r10. In this example, the value stored in register r10 is less than the value stored in register r4. Accordingly, the value of the register r10 remains unchanged, either by skipping the modification of register r10 or by recopying the contents of register r10. For the following "min" instruction "min r10, r10, r5, 4" (instruction 208), the value stored in the four low-order bits of register r5 (register 232) are less than the value stored in register r10. Accordingly, the four low-order bits of register r5 are copied to the four-low-order bits of register r10 and the index supplied as part of the "min" instruction (4 or "0100") is copied to the four high-order bits of the register r10. Accordingly, the register r10 includes the minimum value of the registers r1-r5 as well as the index of the register having the minimum value (i.e., register r5 having an index of 4).

During the execution of the "min" instruction "min r10, r10, r6, 5" (instruction 210), the value stored in the four low-order bits of register r6 (register 234) is determined to be greater than the value stored in register r10. Accordingly, the processor retains the contents of the register r10, where r10 stores both the index and the minimum value of registers r1-r6. During the execution of the next "min" instruction "min r10, r10, r7, 6" (instruction 212), the value stored in the four low-order bits of register r7 (register 236) is determined to be less than the value of register r10. Accordingly, the processor is manipulated to store the value of the four low-order bits of register r7 to the low-order bits of the register r10 as well as store the supplied index (6 or "0110") into the four high-order bits of the register r10. As a result, the register r10 includes both the minimum value and the index of the minimum of registers r1-r7. Likewise, during the execution of the next "min" instruction "min r10, r10, r8, 7" (instruction 214) the value stored in the four low-order bits of register r8 (register 238) is determined to be less than the value stored in the register r10. Accordingly, the value of the four low-order bits of register r8 is stored in the low-order bits of register r10 and the index value ("0111" or 7) supplied as part of instruction 214 is stored in the high-order bits of register r10.

As illustrated by the preceding sequence of "min" processor instructions 202-214, the "min" instruction, when executed in such a manner, stores in the destination register (r10) both the minimum value thus far and it's index. Accordingly, after the sequential execution of the instructions 202-214, the minimum value ("0000") of the registers r1-r8 is stored in the low-order bits of the register r10 while the index corresponding to the register having the minimum value (register r8 having the index 7) is stored in the four high-order bits of the register r10.

The process implementing the instructions 202-214 then can access the register r10 to obtain the index and minimum value for various purposes. For example, the shift-right-immediate instruction "sri r11, r10, 4" (instruction 216) can be used to store the index value in the register r11 (register 240) by shifting the value of register r10 by four bits to the right.

In addition to the convenience of having the minimum value and its index stored in a single register, the "min" instruction also can provide benefit in the form of efficiency. As discussed previously, a network processor in accordance with the present invention can be adapted to execute the min processor instruction in a single cycle. For example, to find the minimum and index of eight registers, only seven cycles are needed (corresponding to seven "min" instructions ). By comparison, known processes for determining a minimum typically utilize a branch instruction and a jump instruction for each comparison with each instruction typically requiring at least one processor cycle, resulting in a minimum of fourteen cycles to determine the minimum of eight registers.

Figure 3:
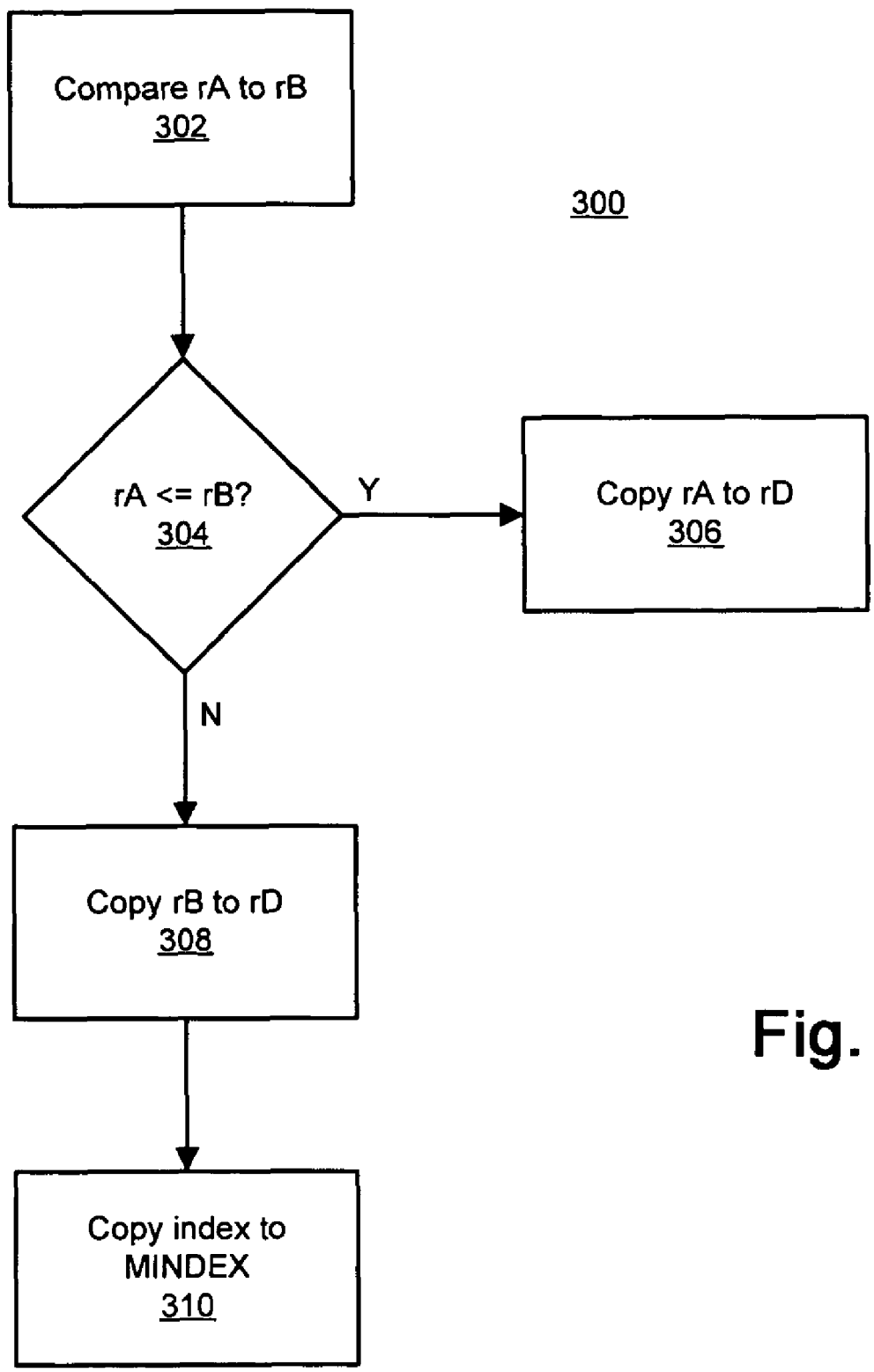
FIG. 3 is a flow diagram illustrating an exemplary "Min" processor instruction for determining a minimum of two values and an index associated with the minimum in accordance with at least one embodiment of the present invention.

Referring now to FIG. 3, another exemplary processor instruction for determining a minimum value of a plurality of values is illustrated in accordance with at least one embodiment of the present invention. It will be appreciated that in some instances, the sum of the number N of bits of a source register used to store a value and the number of bits used to represent an index value may be greater than the total number of bits of the destination register used to store the minimum value. For example, the values to be compared could require twelve bits while the number of register values to be compared could require an index having at least five bits, thereby prohibiting the storage of both the minimum value and the index concatenated in the same 16-bit destination register. Accordingly, in one embodiment, the present invention provides for a processor instruction, herein referred to as the "Min" instruction", adapted to determine the minimum value of two source registers, store the minimum in a destination register, and store the index of the register having the minimum value in another destination register, herein referred to as the "MINDEX" register. As with the "min" instruction discussed above, the "Min" instruction can be represented in Assembly language format as "Min rD, rA, rB, index", where rA, rB are the source registers being compared, rD is the destination register, and index is an immediate field having a constant-value index. The "Min" instruction, in one embodiment, can be executed by a suitable processor in one processor cycle. The execution of the "Min" instruction by a processor is illustrated by the instruction flow diagram 300 of FIG. 3 and as described below.

At step 302, a processor using, for example, a comparator compares the value stored in register rA to the value stored in register rB. If the value of rA is less than or equal to the value of rB (step 304), then the value of rA is stored in the destination register rD at step 306. In the event that the register rA and rD are the same register, the register rA/rD can remain unmodified or the contents of register rA/rD can be recopied.

In the event that the value stored in the register rB is less than the value stored in register rA, then processor is manipulated to store the value of register rB in the register rD at step 308. At step 310, the index associated with the register rB is moved to the MINDEX register. The MINDEX register preferably includes a special-purpose register whereby the modification of the MINDEX register using general-purpose register instructions is limited or prohibited.

Figure 4:
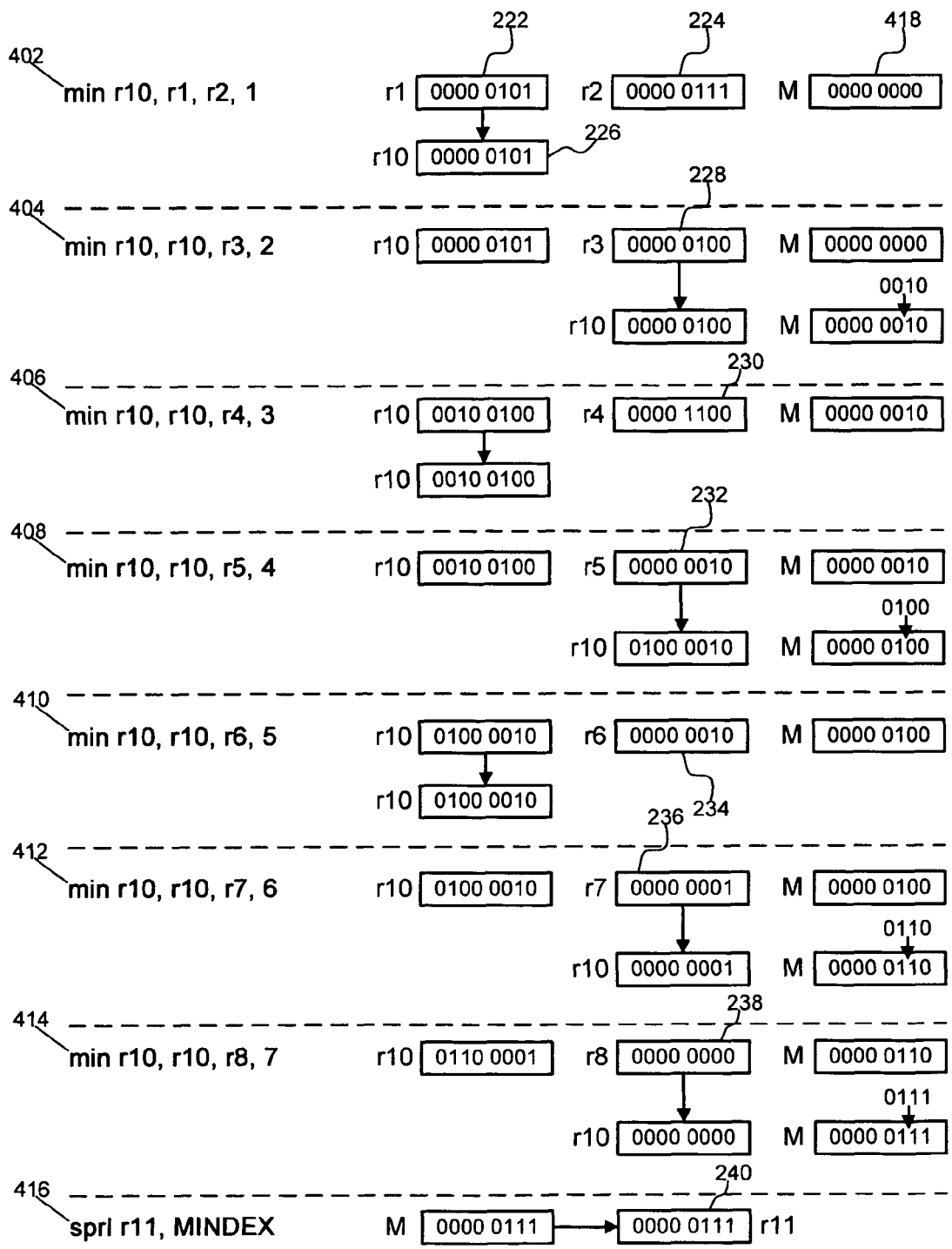
FIG. 4 is a flow diagram illustrating an exemplary sequence of processor instructions of FIG. 3 for determining a minimum of a plurality of values and the index of the minimum in accordance with at least one embodiment of the present invention.

Referring now to FIG. 4, an exemplary implementation of a sequence of "Min" instructions to determine a minimum value of a plurality of registers and the corresponding index is illustrated. In the following sequence of "Min" processor instructions 402-414, the minimum value stored in 8-bit source registers r1-r8 is determined and stored in the destination register r10 and the index of the source register having the minimum value is stored in the MINDEX register.

Min r10, r1, r2 1
Min r10, r10, r3, 2
Min r10, r10, r4, 3
Min r10, r10, r5, 4
Min r10, r10, r6, 5
Min r10, r10, r7, 6
Min r10, r10, r8, 7

For the execution of the first "Min" instruction "Min r10, r1, r2, 1" (instruction 402), the value stored in register r1 (register 222) is compared (step 302, FIG. 3) to the value stored in register r2 (register 224). Since in this example the value of register r1 ("0000 0101") is less than the value of register r2 ("0000 0111"), the value stored in register r1 is stored in the register r10 (step 306, FIG. 3) and since the value of the first source register (register r1) is the minimum of the values of the two source registers, the value of the MINDEX register 418, initiated to value 0, remains unmodified.

During the execution of the next "Min" instruction "Min r10, r10, r3, 2" (instruction 404), the value stored in the register r3 (register 228) is compared to the value stored in the register r10 (register 226). Since in this example the value of register r3 is less than the value stored in the register r10, the value of the register r10 is replaced with the value stored in register r3 (step 308, FIG. 3) and the index supplied with instruction 404 (index of 2 or "0010") is stored in the MINDEX register (step 310, FIG. 3). Accordingly, the register r10 contains the minimum value of the registers r1-r3 and the MINDEX register contains the index of the register having the minimum value (i.e., the index of 2 corresponding to the register r3). The process of comparing the values of the first source register (register r10 in this example) with the remaining source registers r4-r8 (registers 230-238) and storing the minimum value for each comparison in the register r10 and the index of the register having the minimum value in the MINDEX register is repeated for instructions 406-414.

After the execution of instruction 414, the register r10 contains the minimum value of the registers r1-r8 (i.e., the value "0000 0000" of register r8) and the MINDEX register contains the index of the register having the minimum value (i.e., the index of 7 or "0111" corresponding to register r8). Since the MINDEX register preferably includes a special purpose register, the value stored in the MINDEX register can be moved to a general purpose register for subsequent access using, for example, the special processor load instruction "sprl r11, MINDEX" (instruction 416) whereby the value stored in the MINDEX is loaded to the general purpose register r11(register 240).

As with the "min" instruction discussed with reference to FIGS. 1 and 2, network processors in accordance with the present invention can be adapted to execute the "Min" instruction of FIGS. 3 and 4 in a single processor cycle. As a result, the seven "Min" instructions utilized to determine the minimum value of eight registers could be executed in a total of seven cycles compared to known processes requiring at least fourteen processor cycles as a result of the use of both a compare instruction and a jump instruction for each comparison.

Figure 5:
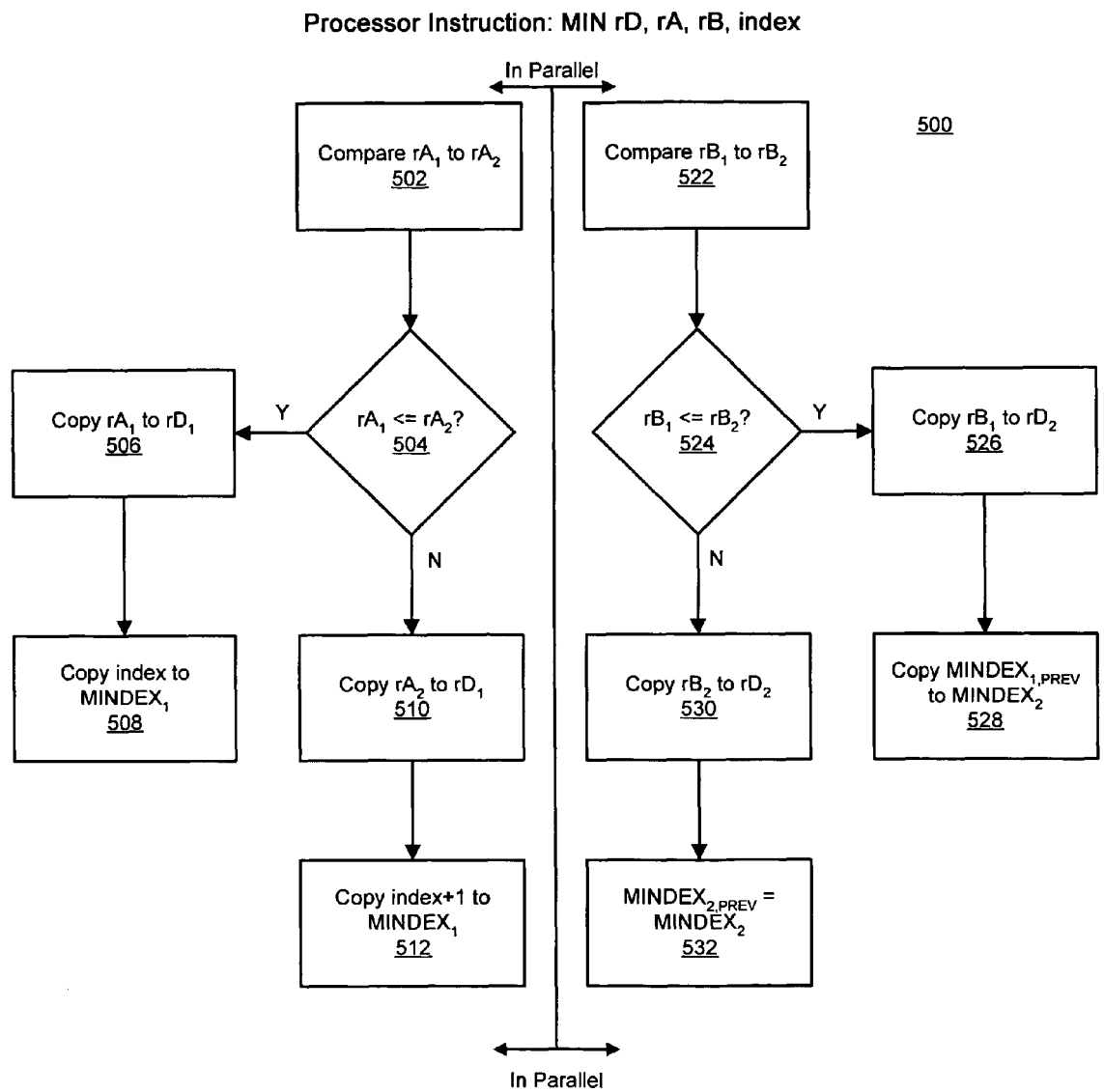
FIG. 5 is a flow diagram illustrating an exemplary "MIN" processor instruction for determining a minimum for each of two sets of values and the indexes of the minimums in accordance with at least one embodiment of the present invention.

Referring now to FIG. 5, yet another exemplary processor instruction for determining a minimum value of a plurality of values is illustrated in accordance with at least one embodiment of the present invention. In some instances, a source register may have the capacity to store two or more values for comparison. For example, a 32-bit source register could be used to store two 16-bit values. Accordingly, in one embodiment, the present invention provides for a processor instruction, herein referred to as the "MIN" instruction", adapted to manipulate a processor to determine, in parallel, the minimum value of two values in a first source register and the minimum value of two values in a second source register and store the minimum value of the first source register and the minimum value of the second source register in a destination register. The "MIN" instruction is further adapted to manipulate the processor to store the indexes of the minimum values in another destination register (i.e., the MINDEX register), which preferably includes a special-purpose register. As with the "min" instruction and "Min" instruction discussed above, the "MIN" instruction can be represented in Assembly language format as "MIN rD, rA, rB, index", where rA, rB are the source registers being compared, rD is the destination register, and index is an immediate field having a constant-value index. The performance of the "MIN" instruction by a processor is illustrated by the following instruction flow diagram 500. The "MIN" instruction can be executed in a single cycle using a suitable processor, such as the exemplary network processor illustrated in FIGS. 7 and 8.

In at least one embodiment, each of the source registers rA and rB have a first portion for storing a first value and a second portion for storing a second value. The values stored in these portions are herein referred to as $rA_1$ and $rA_2$ for register rA and $rB_1$ and $rB_2$ for register rB. These register portions preferably are of equal size. Likewise, the destination register rD and the MINDEX register, in one embodiment, each are separated into two portions, where the two portions of the destination register rD are used to store two minimum values and the two portions of the MINDEX register are used to store the indexes of the two minimum values.

In step 502, the value ($rA_1$) stored in the first portion of the rA register is compared to the value ($rA_2$) stored in the second portion of the rA register. If the value $rA_1$ is less than or equal to the value $rA_2$ (step 504), the value $rA_1$ is stored in the first portion of the destination register rD ($rD_1$) at step 506. At step 508, the supplied value for the index is stored in the first portion of the MINDEX register (herein $MINDEX_1$), indicating that the first portion of the rA register stores the minimum of $rA_1$ and $rA_2$. Alternatively, if the value $rA_2$ is less than the value $rA_1$, the value $rA_2$ is stored in $rD_1$ at step 510 and a value equal to index+1 is stored in $MINDEX_1$ at step 512, indicating the second portion of the rA register stores the minimum of $rA_1$ and $rA_2$.

In step 522, the value ($rB_1$) stored in the first portion of the rB register is compared to the value ($rB_2$) stored in the second portion of the rB register. If the value $rB_1$ is less than or equal to the value $rB_2$ (step 524), the value $rB_1$ is stored in the second portion of the destination register rD ($rD_2$) at step 526. At step 528, the previous value stored in the first portion of the MINDEX register (herein $MINDEX_{1,PREV}$), thereby indicating that the first portion of rB stores the minimum of $rB_1$ and $rB_2$. Alternatively, if the value $rB_2$ is less than the value $rB_1$, the value $rB_2$ is stored in $rD_2$ at step 530 and the value previously stored in the second portion of the MINDEX register (herein $MINDEX_{2,PREV}$) is stored in $MINDEX_2$ at step 532, indicating the second portion of the register rB as storing the minimum of $rB_1$ and $rB_2$.

In at least one embodiment, the present invention provides for a processor being adapted to perform one or more of steps 502-512 in parallel with the corresponding step of steps 522-532. As described in greater detail with reference to FIGS. 7 and 8, the processor can include, for example, dual comparators and multiplexers for parallel comparisons of the values of two registers (steps 502, 522). Furthermore, the processor can be adapted to complete steps 502-532 in a single cycle, resulting in a significant reduction in processing time to find a minimum of a plurality of values.

Figure 6:
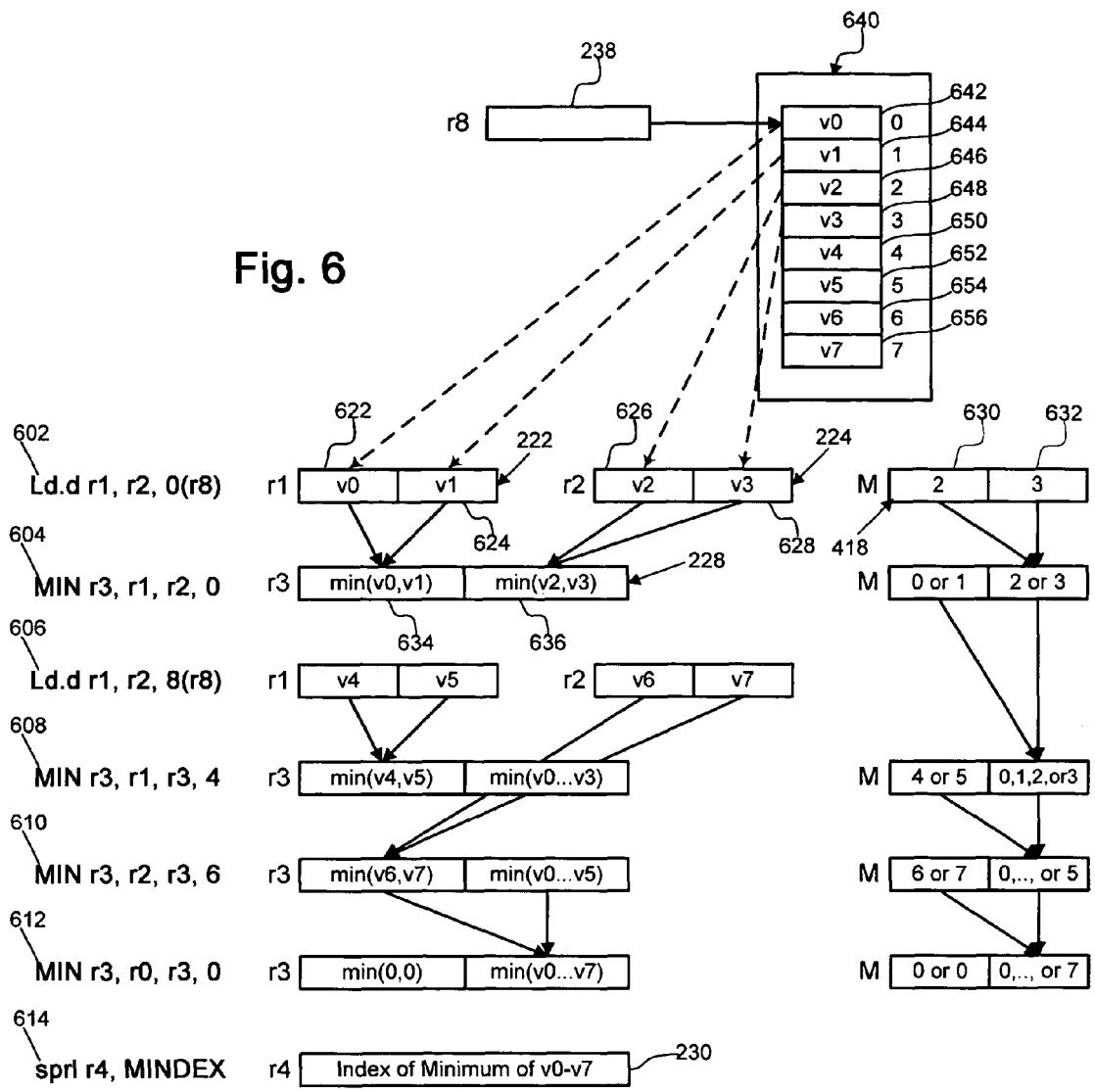
FIG. 6 is a flow diagram illustrating an exemplary sequence of processor instructions of FIG. 5 for determining a minimum of a plurality of values and the index of the minimum in accordance with at least one embodiment of the present invention.

Referring now to FIG. 6, an exemplary implementation of the "MIN" instruction to determine the minimum of a plurality of values stored in memory is illustrated. In the following example, eight values v0-v7 are stored sequentially in sixteen-bit memory blocks 642-656 of memory 640, wherein the memory blocks 642-656 are sequentially addressed. The register r8 (register 238) stores a value that references the first memory block 642 having the first value v0.

A processor (not shown) loads the first two values v0 and v1 from memory 640 to register r2 (register 222) and the next two values v2 and v3 into register r3 (register 224) using, for example, a load double instruction "Ld.d r1, r2, 0(r8)" (instruction 602). The load double instruction has as inputs two registers and an address field. The load double instruction is adapted to manipulate the processor to load sixty-four bits of data (i.e., four words) from memory 640 starting at the address in memory 640 indicated by the input address field (i.e., 0(r8) or 0 bytes offset of the address value stored in register r8). The first two words (i.e., values v0, v1) are loaded as portions 622 and 624, respectively, of register r1 and the second two words (i.e., values v1 and v2) are loaded into portions 626 and 628, respectively, of register r2. Further, prior to the execution of the sequence of processor instructions 602-614, the index of the memory block 646 having the value v2 (i.e., an index of 2 corresponding to memory block 646) is loaded into the first portion 630 of the MINDEX register 418 and the index of the memory block 648 having the value v3 (i.e., an index of 3 corresponding to memory block 648) is loaded into the second portion 632 of the MINDEX register.

After loading values v0-v3 into registers r1 and r2 and initializing the MINDEX register, the instruction "MIN r3, r1, r2, 0" (instruction 604) is executed by the processor. During execution, the value v0 stored in the first portion 622 of the register r1 is compared with the value v1 stored in the second portion 624 and the minimum value of the values v0, v1 (herein denoted as min(v0, v1)) is stored in the first portion 634 of the register r3 (register 228). Likewise, depending on whether value v0 or v1 is the minimum value, either a value of 0 (the supplied index) or 1 (index +1) is stored in the first portion 630 of the MINDEX register 418.

At the same time that the values v0 and v1 in register r1 are being compared, the value v2 in the first portion 626 of the register r2 is compared with the value v3 stored in the second portion 628 and the minimum of the values v2, v3 (herein denoted as min(v2, v3)) is stored in the second portion 636 of the register r3. Depending on whether the value v2 or v3 is the minimum value, either the value stored in the first portion 630 or the value previously stored in the second portion 632 of the MINDEX portion is then stored in the second portion 632 of the MINDEX register 418. For example, if the value v2 is the min(v2, v3), then the index of the memory block having value v2 (memory block 646) previously stored in the first portion 630 of the MINDEX register is moved to the second portion 632 of the MINDEX register. Alternatively, if the value v3 is the min(v2, v3), then the second portion 632 remains unmodified since it already contains the index of the memory block having the min(v2, v3) (memory block 648). Accordingly, after the execution of the instruction 604, the min(v0, v1) is stored in the first portion 634 of the register r3 and the index of the memory block in memory 640 having the min(v0, v1) value is stored in the first portion 630 of the MINDEX register. Likewise, the min(v2, v3) is stored in the second portion 636 of the register r3 and the index of the memory block having min(v2, v3) is stored in the second portion 632 of the MINDEX register.

During the execution of the next instruction, "Ld.d r1, r2, 8(r8)" (instruction 606), the next sixty-four bits are loaded from memory 640 into the registers r1, r2 starting at the memory address having an eight byte offset from the memory address stored in register r8, i.e., the memory block 650 having value v4. The values v4 and v5 are loaded into register r1 and values v6 and v7 are loaded into register r2. Accordingly, during the execution of the next "MIN" instruction "MIN r3, r1, r3, 4" (instruction 608), the minimum of the two values stored in register r3 (i.e., the minimum of min(v0, v1) and min(v2, v3), herein referred to as min(v0-v3)), is determined and subsequently stored in the second portion 636 of the register r3. At the same time, the minimum of values v4 and v5 (i.e., min(v4, v5)) stored in register r1 is determined and stored in the first portion 634 of register r3. Further, the index of the memory block having the min(v4, v5) is stored in the first portion 630 of the MINDEX register by storing the supplied index value of 4 in the first portion if the value v4 is the minimum or by storing a value of index+1, or 5, in the first portion when the value v5 is the minimum. The index of the memory block having the min(v0-v3) is stored in the second portion 632 of the MINDEX register either by storing the previous value stored in the first portion 630 in the second portion 632 if the min(v0, v1) is the min(v0-v3) or by retaining the previous value stored in the second portion 632 if the min(v2, v3) is the min(v0-v3).

Since the next values to be compared, v6 and v7, are already available in register r2 as a result of the previous load double instruction (instruction 606), another "MIN" instruction, "MIN r, r2, r3, 6" (instruction 610) can be executed to determine the minimum of values v6, v7 (i.e., min(v6, v7)) as well as the minimum of min(v4, v5) and min(v0-v3), herein referred to as the min(v0-v5). Accordingly, the min(v4, v5) in the first portion 634 of the register r3 is compared with the min(v0-v3) in the second portion 636 to determine the min (v0-v5). The min(v0-v5) is subsequently stored in the first portion 634 of the register r3.

Simultaneously, the value v6 in the first portion 626 of the register r2 is compared with the value v7 in the second portion 628 to determine the min(v6, v7), which is then stored in the second portion 636 of the register r3. As with the previous "MIN" instruction, the index of the memory block in memory 640 having the min(v6, v7) is stored in the first portion 630 of the MINDEX register by storing the supplied index value of 6 in the first portion if the value v6 is the minimum or by storing a value of index +1, or 7, in the first portion when the value v5 is the minimum. The value previously stored in the first portion 630 is moved to the second portion 632 of the MINDEX register if the min(v4, v5) is the min(v0-v5) or the value stored in the second portion 632 remains unchanged if the min(v0-v3) is the min(v0-v5).

In the same manner, the "MIN" instruction "MIN r3, r0, r3, 0" (instruction 612) is executed resulting in the minimum of values v0-v7 (i.e., min(v0-v7)) being stored in the second portion 636 of register r3 and the index of the memory block having the min(v0-v7) being stored in the second portion 632 of the MINDEX register. However, rather than use a register having values from memory as a first source register, a register r0 (not shown) storing a constant value of zero is used. Accordingly, after the execution of the instruction 612, the bits of first portion 634 of the register r3 are populated with zeros (i.e., min(0,0)), as are the bits of the first portion 630 of the MINDEX register. Therefore, the entire value stored in register r3 is the 32-bit version of the 16-bit value stored in the second portion 636 and the entire value stored in the MINDEX register is the 32-bit version of the 16-bit value stored in the second portion 632. Accordingly, the minimum of values v0-v7, min(v0-v7), can be obtained directly from the register r3 after execution of the instruction 612. Likewise, the index of the memory block storing the min(v0-v7) can be obtained using, for example, the special processor register load instruction "sprl r4, MINDEX" (instruction 614) whereby the index value stored in the MINDEX register is loaded into the general purpose register r4 (register 230) for subsequent access.

As FIG. 6 illustrates, a sequence of "MIN" instructions can be implemented to efficiently determine the minimum value of a plurality of values as well as an index associated with the minimum value. Known instruction sequences typically would require a minimum of fourteen instructions to determine the minimum of eight values as each comparison typically is implemented using both a compare and jump instruction. In comparison, only four "MIN" instructions and a load instruction are needed to obtain both the minimum of eight values as well as its index in memory. Accordingly, if each compare instruction, jump instruction requires one cycle and each "MIN" instruction and sprl load instruction requires one cycle, the instruction sequence of FIG. 6 requires at least nine fewer cycles to complete, assuming the processing time required to load the values from memory is equivalent in either case.

In many implementations, the minimum of a plurality of values is periodically determined as the values stored in memory and/or the source registers change. In such cases, the values may be incremented such that an overflow of the maximum represented integer occurs, resulting in the incremented value wrapping around to zero. Accordingly, in at least one embodiment, the two most significant bits of each value being compared during the execution of the "min" instruction (step 102, FIG. 1), the "Min" instruction (step 302, FIG. 3), and/or the "MIN" instruction (steps 502, 522, FIG. 5) are examined. If both values do not have a value of "00" for the two most significant bits, the values are compared as described above. However, if one of the values has a value of "00" for its two most significant bits and the other value has a value of "11" for its two most significant bits, then the latter value is considered the minimum of the two values.

The special consideration of the two most significant bits can enable a system to increment values without the need for checking for overflow and/or without requiring the values to be updated/modified at each occurrence of overflow, assuming that the maximum increment of a value is no more than one-fourth of the maximum represented integer of the register/memory block. Although a process for examining the two most-significant bits in implementations having value increments limited to one-fourth the maximum represented integer is discussed above, those skilled in the art can implement processes for examining fewer or more most significant bits when the maximum value increments are more than or less than one-fourth of the maximum represented integer, using the guidelines provided herein.

Figure 7:
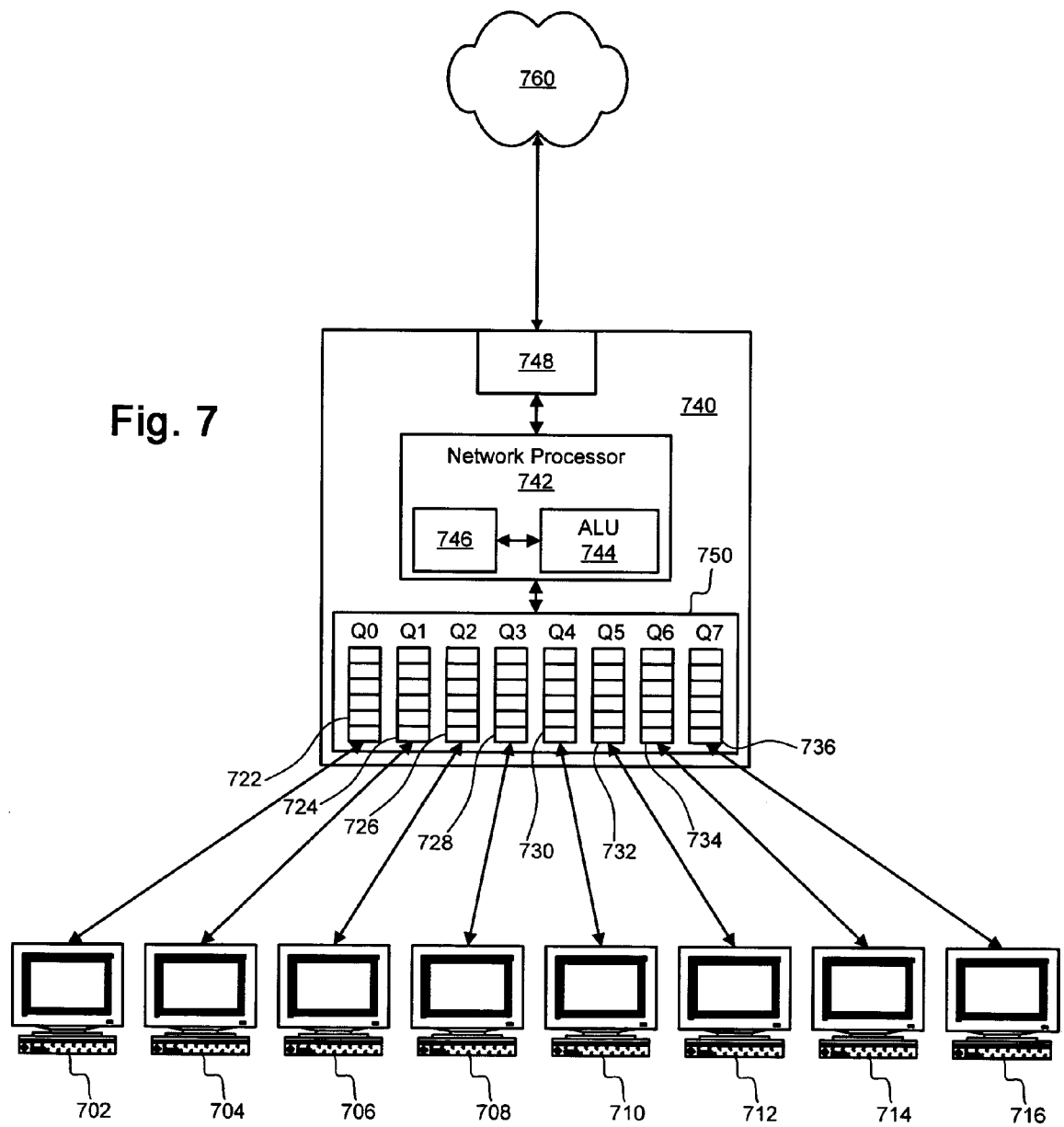
FIG. 7 is a schematic diagram illustrating an exemplary customer premise equipment (CPE) using Weighted Fair Queuing (WFQ) in accordance with at least one embodiment of the present invention.
Figure 8:
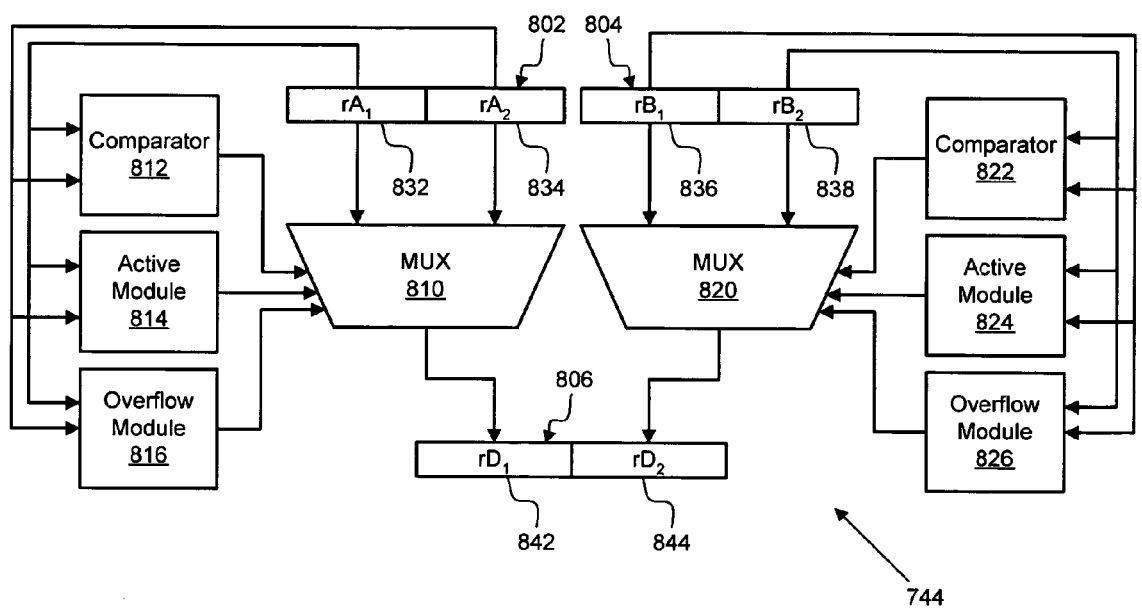
FIGS. 8 and 9 are schematic diagrams illustrating an arithmetic logic unit of the CPE of FIG. 7 for determining a minimum for each of two sets of values and the indexes associated with the minimums in accordance with at least one embodiment of the present invention.

Referring now to FIGS. 7 and 8, an exemplary implementation of a network processor adapted to execute the "min", "Min", and/or "MIN" processor instruction is illustrated in accordance with at least one embodiment of the present invention. As discussed above, many network systems utilize Weighted Fair Queuing (WFQ) to "fairly" multiplex multiple input streams into a single output stream. To illustrate, a CPE 740 may be implemented in the network 700 as a gateway between, for example, a wide area network (WAN) 760 and a plurality of network devices 702-716 on a local area network (LAN). The CPE 740 may include any of a variety of CPE devices, such as a bridge, router, hub, switch, telephone modem, cable modem, digital subscriber line (DSL) modem, fiber-optic modem, gateway, and the like. Each of network devices 702-716 (e.g., a desktop computer) provides a stream of data packets for the CPE 740 to process and then output over a single connection to the WAN 760. The CPE 740 therefore includes a plurality of input queues 722-736 in memory 750, each input queue corresponding to one of the network devices 702-716. Each input queue buffers the incoming data from the corresponding network device until the network processor 742 selects the queue for output of a data packet from the selected queue to the WAN 760 via an output interface 748 (e.g., a Utopia interface).

In at least one embodiment, the network processor 742 is adapted to implement a WFQ process in order to ensure that each input queue receives its share of the output bandwidth and to provide a latency bound for each queue. Accordingly, each input queue could be given a priority via a "due" timestamp associated with each input queue, whereby the next packet in the input queue having the minimum "due" timestamp is selected for output during a queuing cycle. After selection, the "due" timestamp of the selected queue is incremented by a predetermined amount. In one manner, the network processor 742 performs the WFQ process by determining the minimum "due" timestamp as well as identifying the queue having this minimum "due" timestamp.

The heap data structure is commonly used to implement prioritization of input queues. Once a heap is generated from a plurality of values, such as the "due" timestamps of the input queues, the minimum value is at the root node of the heap. Accordingly, the minimum of the plurality of values can be determined easily by accessing the root node of the heap. However, since the value of the "due" time stamp of a queue is incremented during or after selection, the old value of the "due" time stamp should be removed from the heap, the heap rebuilt, and the new value of the "due" time stamps inserted. As will be appreciated by those skilled in the art, the insertion of a new value into a heap or the rebuilding of a heap after the removal of a value typically includes finding the minimum value of the child nodes of a parent node. The network processor 742 can be adapted to implement the one or more of the various processor instructions for determining a minimum value described herein to efficiently determine the minimum value during the maintenance of a heap data structure. The network processor 742 includes, in one embodiment, an arithmetic logical unit (ALU) 744 and register file 746 having a plurality of general purpose registers and/or special purpose registers in order to implement the "min", "Min", and "MIN" processor instructions described above.

Figure 9:
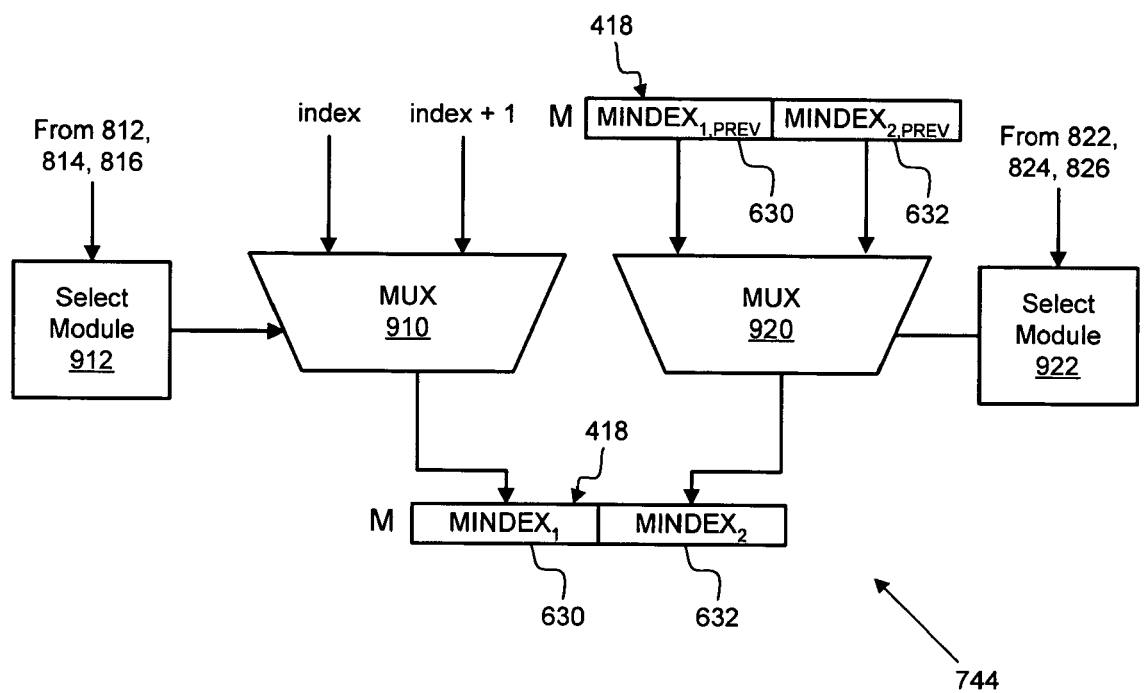

FIGS. 8 and 9 illustrate an exemplary implementation of the ALU 744 in greater detail in accordance with at least one embodiment of the present invention. The network processor 742, in at least one embodiment, is adapted to perform the "MIN rD, rA, rB, index" instruction of FIG. 3 in one processor cycle using the ALU 744 and register file 746. As illustrated in FIG. 8, the ALU 744 includes two multiplexers (MUX) 810, 820 adapted to operate in parallel. The MUX 810 has as inputs the value $rA_1$ stored in the first portion 832 and the value $rA_2$ stored in the second portion 834 of the first source register rA (register 802) and the value $rD_1$ output from the MUX 810 is stored in the first portion 842 of the destination register rD (register 806). The MUX 820 has as inputs the value $rB_1$ stored in the first portion 836 and the value $rB_2$ stored in the second portion 838 of the second source register rB (register 804) and the value $rD_2$ output from the MUX 820 is stored in the second portion 844 of the destination register rD. Further, the ALU 744 includes a comparator 812, an active module 814, and an overflow module 816 for providing control signals to the MUX 810 and a corresponding comparator 822, active module 824, and overflow module 826 for providing control signals to the MUX 820.

In at least one embodiment, the comparator 812 is adapted to compare the values $rA_1$, $rA_2$ in the register 802 to determine the minimum of the values $rA_1$, $rA_2$. The comparator 812 then provides a signal to the MUX 810 directing the MUX 810 to output the minimum of values $rA_1$, $rA_2$ for storage in the first portion 842 of the destination register 806. As discussed above, there may be potential for overflow of the values stored in the first portions 832, 834 due to an increment that increases the stored values above the maximum represented integer, resulting in the wraparound of the values to zero.

Accordingly, the overflow module 816, in parallel with the comparison performed by the comparator 812, examines the two most significant bits of the values $rA_1$, $rA_2$, to determine if any of the values have wrapped around zero. If one of the values $rA_1$, $rA_2$, have the value "00" at its two most significant bits and the other value has "01" at its two most significant bits, the value having "01" at the two most significant bits is determined to be the minimum of the values $rA_1$, $rA_2$ and the overflow module 816 provides a signal to the MUX 810 indicating the minimum. This signal can be used by the MUX 810 to output the minimum of values $rA_1$, $rA_2$ into the first portion 842 of the register 806. It will be appreciated that since the comparator 812 compares the values $rA_1$, $rA_2$ without regard to overflow, the signal indicating the minimum provided by the comparator 812 may conflict with the signal indicating the minimum provided by the overflow module 816. In this case, the signal from the overflow module 816 overrides the signal from the comparator 812.

Furthermore, in one embodiment, the least significant bit for each of values $rA_1$, $rA_2$ is reserved to indicate an active status associated with the value. To illustrate, recall that the values $rA_1$, $rA_2$ can represent the "due" timestamps associated with two input queues of the CPE 740 (FIG. 7). Since one or more of the input queues may be deactivated based on, for example, the loss of a connection to the corresponding network device, it may be desirable to prevent the network processor 742 from attempting to transmit data from the deactivated input queue. Therefore, the least significant bit may be utilized as an active status bit, wherein a value of "0" indicates the input queue is active and a value of "1" indicates the input queue is inactive. To prevent the unintended activation/deactivation of the input queues represented by values $rA_1$, $rA_2$, the network processor 742 can be adapted to increment/decrement the values $rA_1$, $rA_2$, by multiples of two.

In parallel with the comparator 812 and/or the overflow module 816, the active module 814 examines the least significant bit of the values $rA_1$, $rA_2$ to determine if one or more of the active bits are set to "inactive" (i.e., a value of "1"). If one of the values $rA_1$, $rA_2$ is inactive, the active module 814 selects the active value as the minimum and provides a signal to the MUX 810 indicating the active value as the minimum value. If both values are inactive, the active module 814 selects the first value $rA_1$ and provides a signal to the MUX 810 indicating the value $rA_1$ as the minimum regardless of the actual relation between the values $rA_1$, $rA_2$. Since the active module 814 is adapted to examine the active status bit to determine the statuses associated with the values $rA_1$, $rA_2$, the signal indicating the minimum provided by the active module 814 may conflict with the signals provided by the overflow module 816 and/or the comparator 812. Accordingly, in one embodiment, the signal from the active module 814 overrides the signals from both the comparator 812 and the overflow module 816.

Based on the signals provided from the comparator 812, the active module 814, and/or the overflow module 816 operating in parallel, the MUX 810 selects the "minimum" of the values $rA_1$, $rA_2$ for output to the first portion 842 of the destination register 806. In the same manner, the comparator 822, active module 824, and overflow 826 examine the values $rB_1$, $rB_2$ to determine the "minimum" for output by the MUX 820 to the second portion 844 of the destination register 806.

FIG. 9 illustrates an exemplary implementation of a portion of the ALU 744 for storing the indexes of the corresponding values in the destination register rD. As illustrated, the ALU 744 additionally includes two multiplexers 910, 920 for selecting the appropriate index value for storage in the corresponding portion of the MINDEX register 418. The MUX 910 has as inputs the value of the supplied index and the value of index+1. Based on input provided from the comparator 812, the active module 814, and/or the overflow module 816 representing the minimum value determined from the values $rA_1$ and $rA_2$ of the register rA, the index select module 912 is adapted to provide a signal to the MUX 910 indicating which of index, index+1 is to be selected for output and storage in the first portion 630 of the MINDEX register 418. To illustrate, if the input to the index select module 912 indicates the value $rA_1$ is the "minimum", then the index select module 912 can be adapted to direct the MUX 910 to select the index input for output to the first portion 630, whereas if the value $rA_2$ is the "minimum", the index select module 912 can direct the MUX 910 to select the index +1 for output.

In a similar-manner, the index select module 922 receives input from the comparator 822, the active module 824, and/or the overflow module 826 indicating the "minimum" of the values $rB_1$ and $rB_2$ of the register rB. However, rather than having index and index +1 as inputs, the MUX 920 has as inputs the value stored in the first portion 630 of the MINDEX register and the value stored in the second portion 632 after the execution of the previous "MIN" command (i.e., $MINDEX_{1,PREV}$ and $MINDEX_{2,PREV}$, respectively). Based on the indicated "minimum" of $rB_1$ and $rB_2$, the select module 922 is adapted to direct the MUX 920 to output for storage in the second portion 632 either the $MINDEX_{1,PREV}$ value ($rB_1 <= rB_2$) or the $MINDEX_{2,PREV}$ value ($rB_2 < rB_1$).

In at least one embodiment, the processing block comprising the comparator 812, the active module 814, the overflow module 816, the select module 912, and the MUXs 810, 910 operates in parallel with the corresponding component of the processing block comprising the comparator 822, the active module 824, the overflow module 826, the select module 922, and the MUXs 820, 920. As a result, the minimums of two sets of two values, as well as their indexes, can be determined simultaneously, preferably in one processor cycle.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A communications processor for implementing scheduling processes and reducing the processing effort for determining a minimum value of a plurality of values stored in source registers and determining an index value of a source register having the minimum value, the communications processor comprising:
    a destination register;
    a first source register storing a first value, wherein the first source register comprises S bits, and wherein the first value comprises N lower bits of the first source register;
    a second source register storing a second value, wherein the second source register comprises S bits, and wherein the second value comprises N lower bits of the second source register;
    means for comparing the first value stored in the first source register with the second value stored in the second source register, wherein the first source register and the second source register each include an active status bit to indicate a status of the respective register;
    means for storing the first value in the destination register when the first value is less than or equal to the second value;
    means for concatenating the index value with the second value into a concatenated value and storing the concatenated value in the destination register when the second value is less than the first value; and
    means for overriding a result from the comparing means based on the active status bits of the first and second source registers, wherein the index value is stored in an upper (S−N) bits of the concatenated value and the second value stored in the N lower bits of the concatenated value.

2. The processor of claim 1, wherein the means for comparing, the means for storing and the means for concatenating are adapted to execute sequentially within one processor cycle.

3. The processor of claim 1, wherein the first source register and the destination register comprise a same register.

4. The processor of claim 1, wherein the second source register and the destination register comprise a same register.

5. The processor of claim 1, wherein the first value is stored in N low-order bits of the first source register and the second value is stored in N low-order bits of the second register, N being an integer value.

6. A method implemented as instructions for manipulating a network processor for implementing scheduling processes and reducing a number of network processor cycles for determining a minimum value and a corresponding index value of a plurality of source registers of the network processor, the method comprising the steps of:
    initializing a destination register with an index value and a value of a first source register from among the plurality of source registers;
    for each of the plurality of source registers, comparing a value stored in the source register with a value stored in a destination register;
    concatenating the value stored in the source register with an index value associated with the source register and storing the concatenated value in the destination register when the value stored in the source register is less than the value stored in the destination register;
    examining active status bits comprising the least significant bits of the values in the source register and in the destination register;
    based on the active status bits, overriding the comparing step and selecting an active value as a current minimum, wherein comparing, concatenating, and storing are implemented by a single processor instruction and performed within a single processor cycle by the network processor, wherein each of the plurality of values represents a due timestamp of a corresponding input queue.

7. The method of claim 6, wherein the plurality of values representing a due timestamp of a corresponding input queue is used for implementing Weighted Fair Queuing.

8. A customer premise equipment (CPE) comprising:
    a network interface operably connected to a first network segment;
    a second network interface operably connected to a second network segment; and
    a processor operably connected to the network interfaces and being adapted to:
        compare a first value stored in a first source register of the processor with a second value stored in a second source register of the processor;
        store the first value in a first destination register of the processor when the first value is less than or equal to the second value;
        store the second value in the first destination register of the processor and an index value in a second destination register of the processor when the second value is less than the first value, the index value representing the second source register, wherein the first source register and the second source register both include a status identifier for indicating whether the respective register is active or inactive, wherein the status identifier comprises the least significant bit of the value in each respective register; and
        override comparison of the first and second values based on the status identifiers.

9. The CPE of claim 8, wherein the processor is further adapted to compare the first and second values and store values in the destination registers within one processor cycle.

10. The CPE of claim 8, wherein the first value and second value each represents a due timestamp of a corresponding input queue for implementing Weighted Fair Queuing for at least one data stream between the first network segment and the second network segment.

11. A communications processor for determining a maximum value of a plurality of values stored in source registers and determining an index value of a source register having the maximum value for scheduling transmission of data, the communications processor comprising:
 a destination register;
 a first source register storing a first value;
 a second source register storing a second value;
 means for comparing the first value stored in the first source register with the second value stored in the second source register, wherein the first source register and the second source register both include a status bit to indicate whether the respective register is active or inactive;
 means for overriding a result from the comparing means based on the status bits of the first and second source registers;
 means for storing either the first value or the second value according to the comparing means and the overriding means, wherein the storing means stores the first value in the destination register when the first value is greater than or equal to the second value and when the first value and second value are both active; and
 means for concatenating the index value with the second value into a concatenated value and storing the concatenated value in the destination register when the second value is greater than the first value.

12. The processor of claim 11, wherein the means for comparing, the means for storing and the means for concatenating are adapted to execute sequentially within one processor cycle.

13. The processor of claim 11, wherein the first source register and the destination register comprise a same register.

14. The processor of claim 11, wherein the second source register and the destination register comprise a same register.

15. The processor of claim 11, wherein the first value is stored in N low-order bits of the first source register and the second value is stored in N low-order bits of the second register, N being an integer value.

16. A method implemented as instructions executed by a communications processor for implementing scheduling processes and reducing a number of processor cycles for determining a maximum value and a corresponding index value of a plurality of source registers of the processor, the method comprising the steps of:
 initializing a destination register with an index value and a value of a first source register from among the plurality of source registers;
 for each of the plurality of source registers, comparing a value stored in the source register with a value stored in a destination register, wherein values stored in the plurality of source registers represent due timestamps of corresponding input queues used for transmission of data packets;
 concatenating the value stored in the source register with an index value associated with the source register and storing the concatenated value in the destination register when the value stored in the source register is greater than the value stored in the destination register; and
 examining active status bits comprising least significant bits of the source and destination register values, wherein comparing, concatenating, and storing are performed within a single processor cycle; and
 overriding the comparing step based on the active status bits.

17. The method of claim 16, wherein the steps of comparing, concatenating, and storing are implemented by a single processor instruction.

18. The method of claim 16, wherein the plurality of values representing due timestamps are used for implementing Weighted Fair Queuing.

19. A customer premise equipment (CPE) comprising:
 a network interface operably connected to a first network segment;
 a network interface operably connected to a second network segment; and
 a processor operably connected to the network interfaces and being adapted to:
  compare a first value stored in a first source register of the processor with a second value stored in a second source register of the processor;
  store the first value in a first destination register of the processor when the first value is greater than or equal to the second value;
  store the second value in the first destination register of the processor and an index value in a second destination register of the processor when the second value is greater than the first value, the index value representing the second source register, wherein the first source register and the second source register both include a status identifier for indicating whether the respective register is active or inactive, and wherein the processor is configured to transmit data based on the status; and
  override comparison of the first and second values based on the status identifiers.

20. The CPE of claim 19, wherein the processor is further adapted to compare the first and second values and store values in the destination registers within one processor cycle.

21. The CPE of claim 19, wherein the first value and second value each represents a due timestamp of a corresponding input queue for implementing Weighted Fair Queuing for at least one data stream between the first network segment and the second network segment.

* * * * *